United States Patent
Bundza et al.

(10) Patent No.: US 7,057,904 B2
(45) Date of Patent: Jun. 6, 2006

(54) MULTIPART ELECTRONIC CIRCUIT ASSEMBLY WITH DETACHABLY INTERCONNECTING AND LOCKING COMPONENT CIRCUIT SUBSTRATES

(75) Inventors: Nicholas Bundza, Nepean (CA); Fabien Letourneau, Aylmer (CA); Gregory William Cheshire, Woodlawn (CA)

(73) Assignee: Alcatel (FR)

( * ) Notice: Subject to any disclaimer, the term of this patent is extended or adjusted under 35 U.S.C. 154(b) by 0 days.

(21) Appl. No.: 10/896,061

(22) Filed: Jul. 22, 2004

(65) Prior Publication Data

US 2005/0265010 A1 Dec. 1, 2005

(51) Int. Cl.
*H05K 7/14* (2006.01)
*H05K 7/18* (2006.01)

(52) U.S. Cl. .................. 361/801; 361/756; 361/727; 439/61

(58) Field of Classification Search ............... 361/752, 361/790, 796–797, 756, 727, 741, 686, 801–802; 439/61, 374
See application file for complete search history.

(56) References Cited

U.S. PATENT DOCUMENTS

| | | | |
|---|---|---|---|
| 5,848,906 A * | 12/1998 | Glusker et al. ............. | 439/157 |
| 6,059,610 A | 5/2000 | Chu | |
| 6,071,143 A | 6/2000 | Barthel et al. | |
| 6,419,499 B1 | 7/2002 | Bundza | |
| 6,580,616 B1 * | 6/2003 | Greenside et al. .......... | 361/752 |
| 6,625,035 B1 * | 9/2003 | Steinman et al. ........... | 361/759 |
| 6,646,890 B1 | 11/2003 | Byers et al. | |
| 2002/0145858 A1 * | 10/2002 | Hayashi et al. ............. | 361/798 |

* cited by examiner

*Primary Examiner*—Kamand Cuneo
*Assistant Examiner*—Hung S. Bui
(74) *Attorney, Agent, or Firm*—Kramer & Amado, P.C.

(57) ABSTRACT

An assembly of releasably interconnected circuit substrates is provided. The assembly has a first and second circuit substrate. Each substrate provides an electrical connector for mating electrical engagement of the first and second substrates. The assembly also has a two-position lock that is operable between a first and second position. In the first position of the lock, the first and second circuit substrates are in locked interconnection with each other. In the second position of the lock, the first and second circuit substrates are separable from each other.

14 Claims, 10 Drawing Sheets

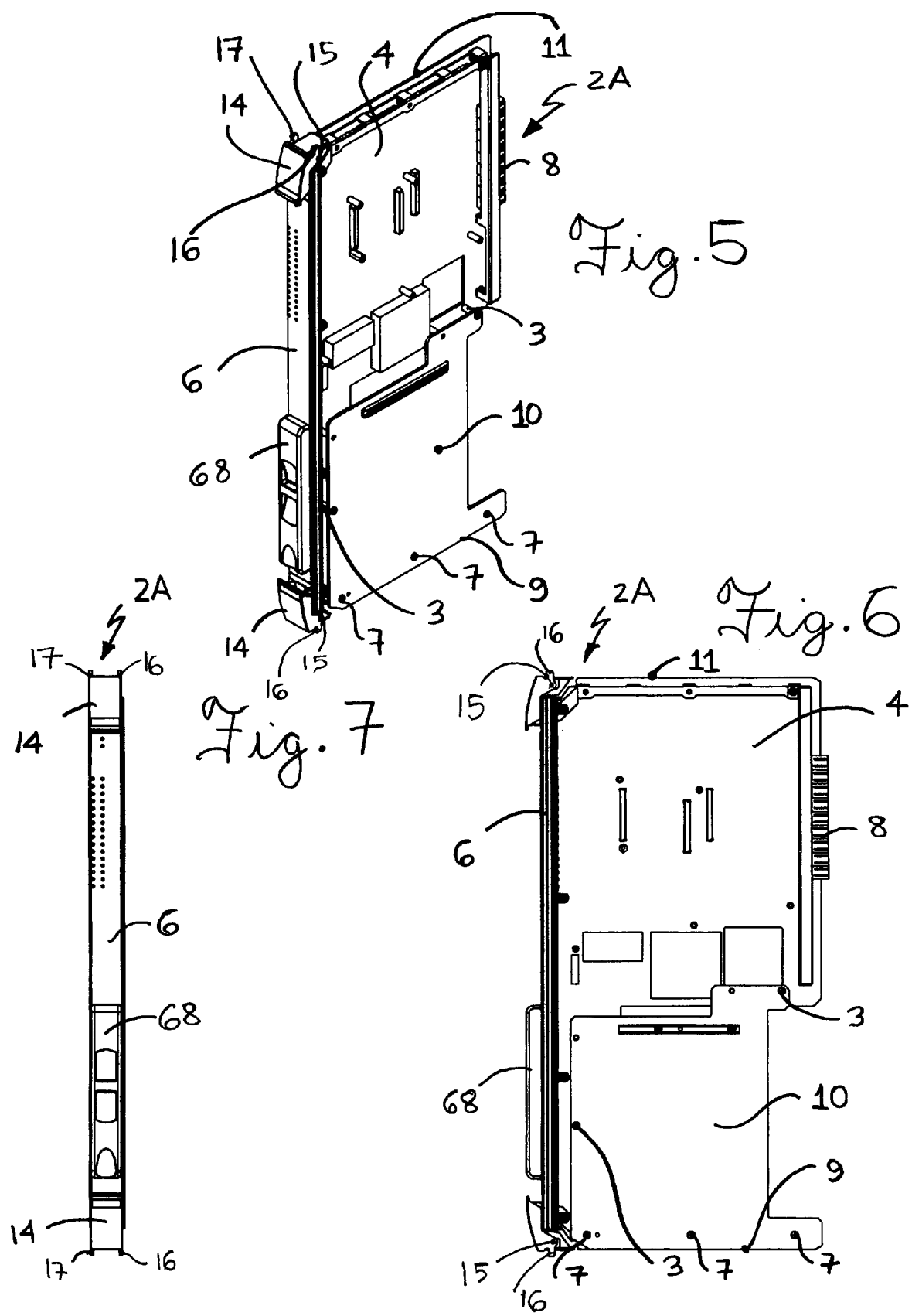

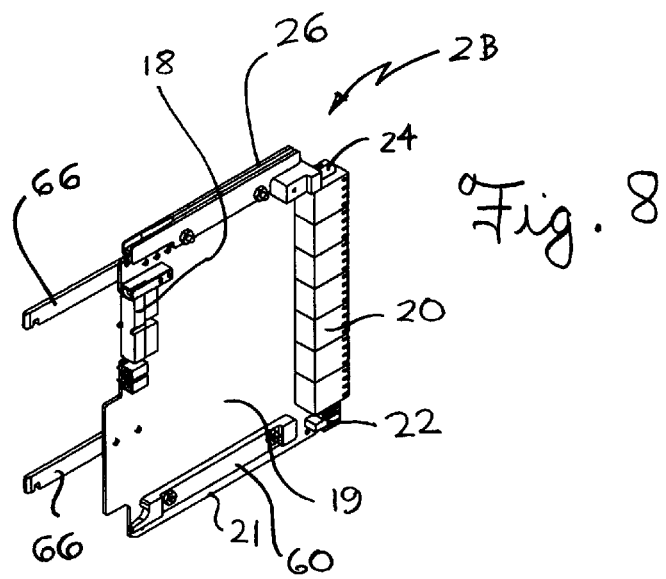
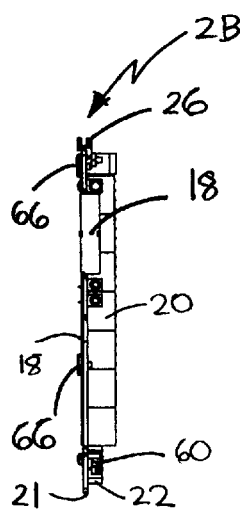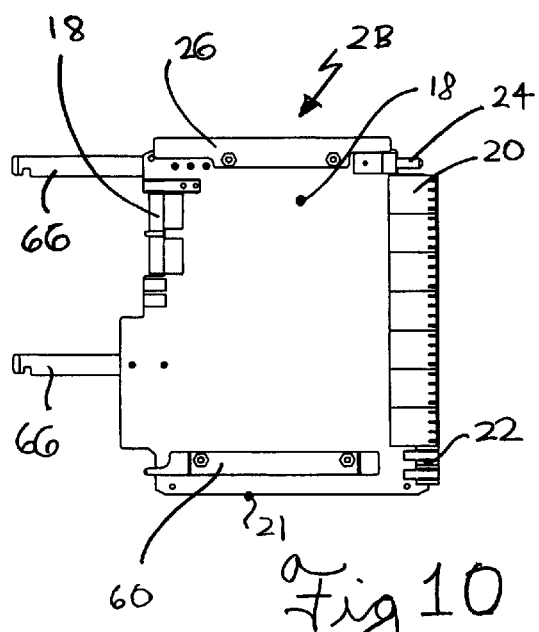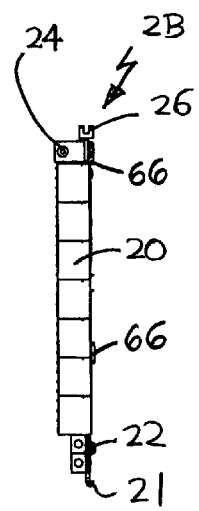

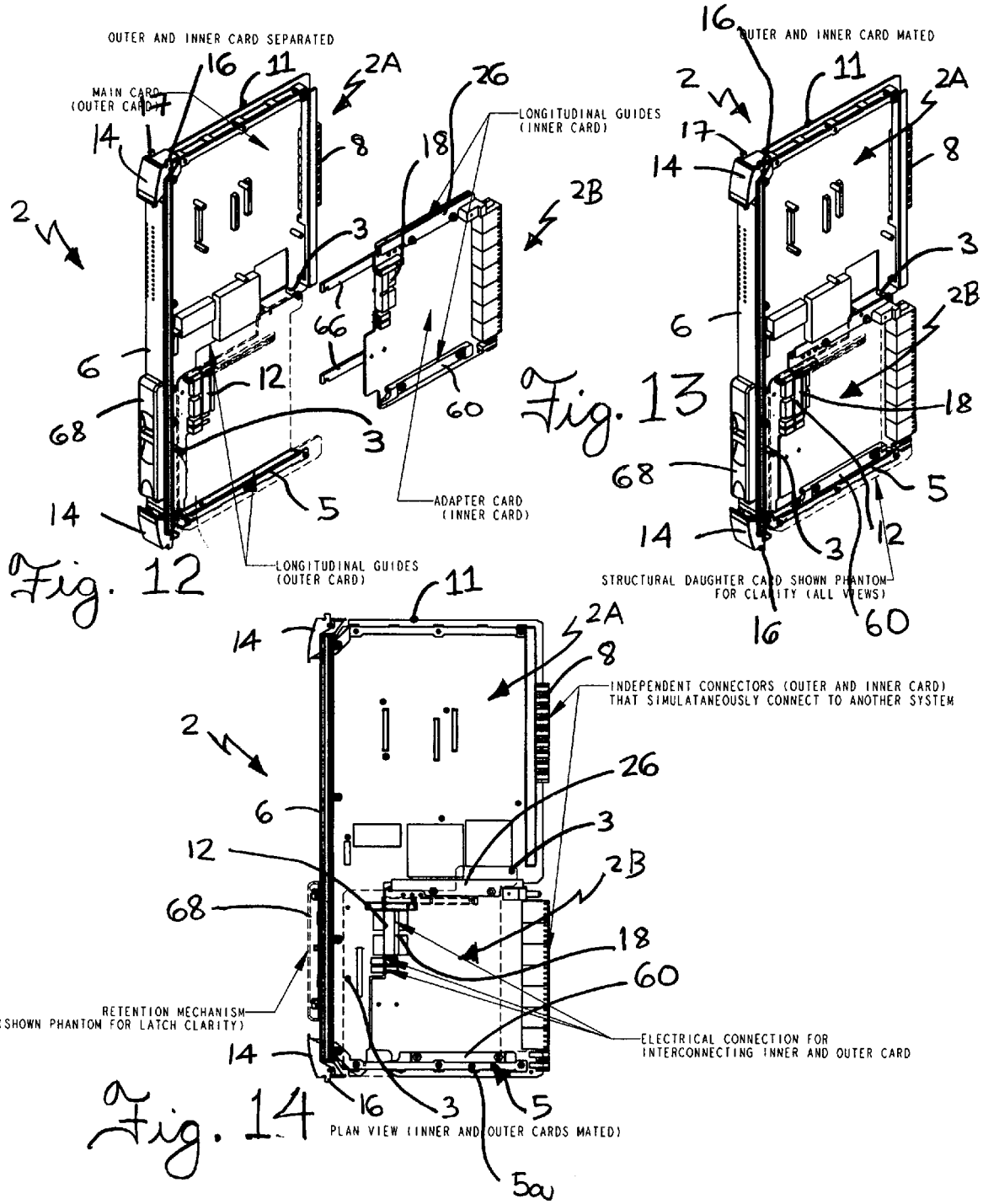

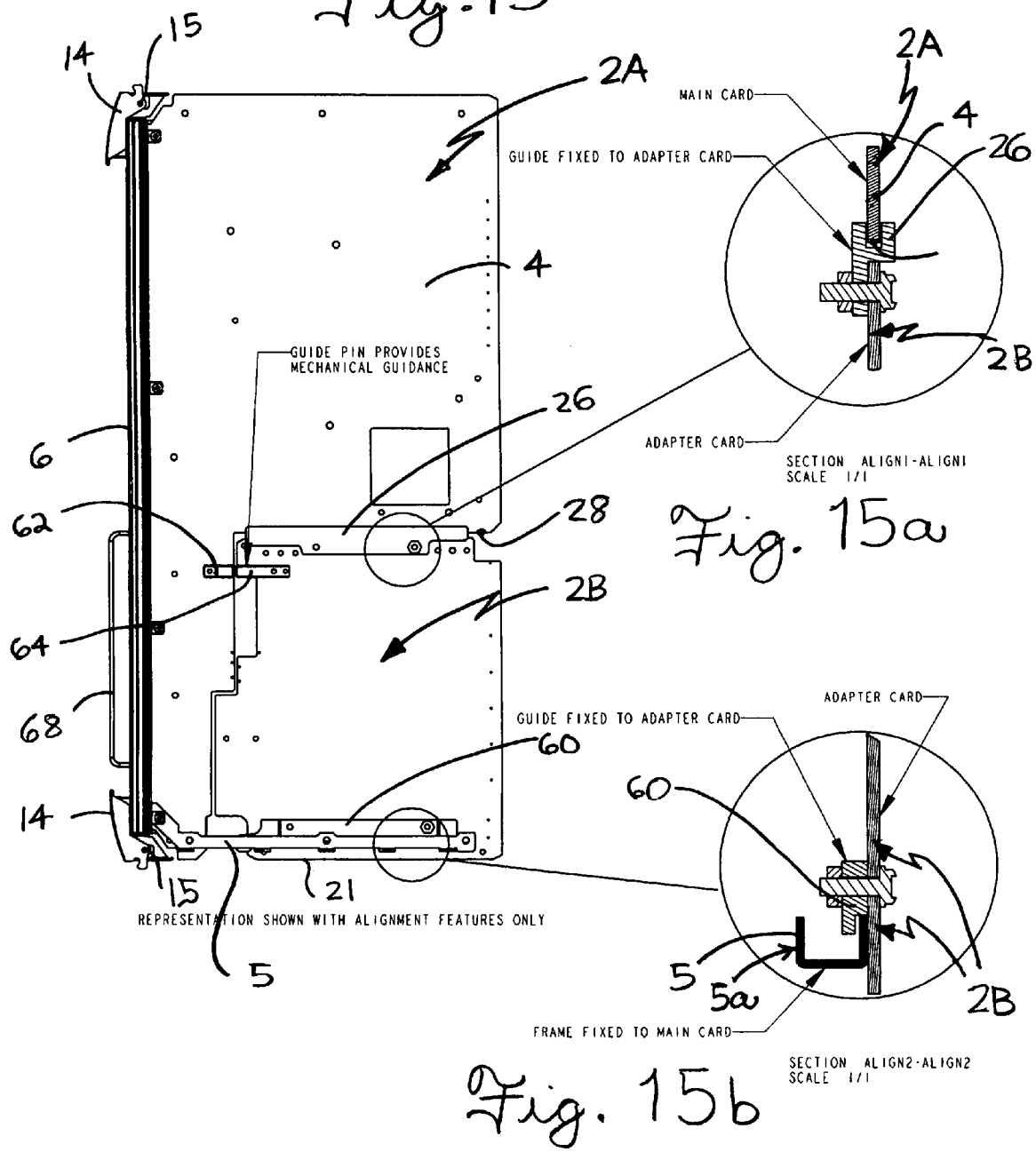

MAIN CARD TO ADAPTER CARD ALIGNMENT FEATURES CONT'D

ISOMETRIC VIEW OF MAIN AND ADAPTER CARDS SHOWING ONLY ALIGNMENT FEATURES

ISOMETRIC VIEW OF MAIN AND ADAPTER CARDS SHOWING ONLY ALIGNMENT FEATURES

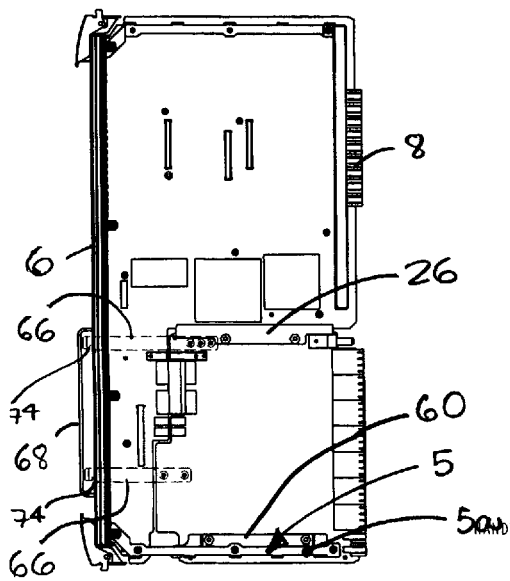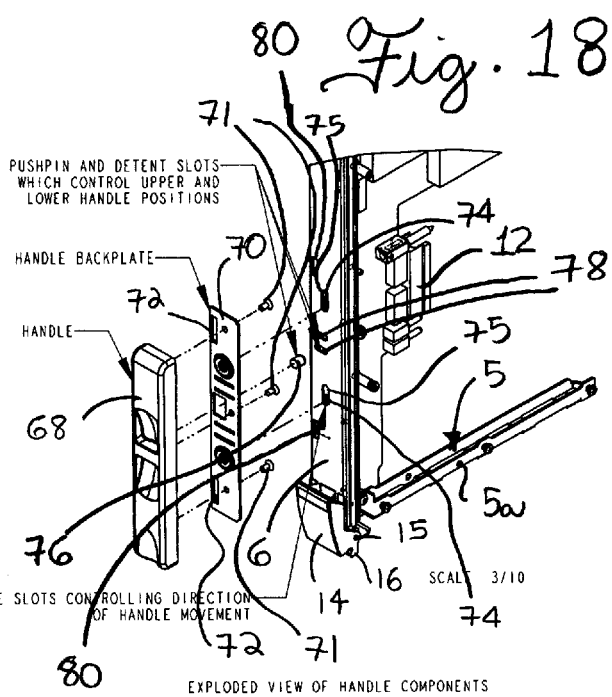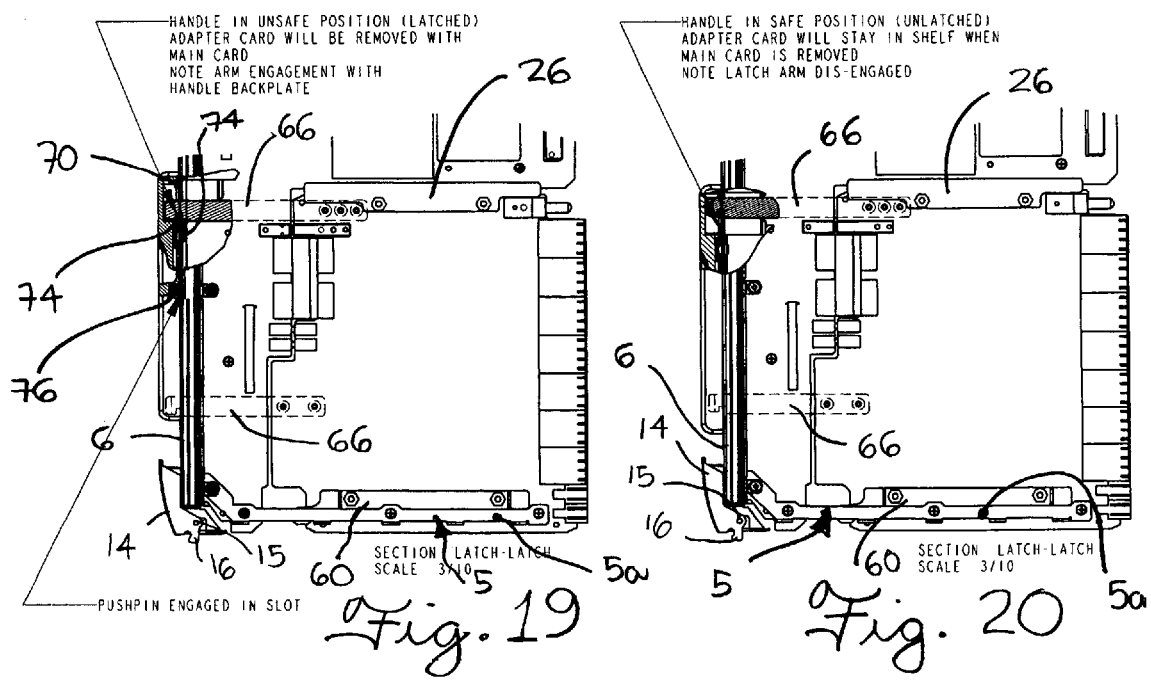

MULTIPART ELECTRONIC CIRCUIT ASSEMBLY WITH DETACHABLY INTERCONNECTING AND LOCKING COMPONENT CIRCUIT SUBSTRATES

FIELD OF THE INVENTION

The present invention relates generally to the field of electronic circuit substrates and more particularly, to an electronic circuit assembly have two or more component substrates that detachably interconnect and lock to one another.

BACKGROUND OF THE INVENTION

Electronic equipment conventionally comprises an enclosure such as a box-shaped housing containing electronic circuitry. In some instances, a face of such a housing is open so as to provide access to shelves, each of which may be configured with receiving stations for holding electronic circuitry units or circuit packs in a side-by-side or top-to-bottom relationship. Typically, such units comprise at least one circuit substrate such as a printed circuit board or card carrying a plurality of electronic components. When installed into such a housing, one or more of these units may be connected to electrical connectors mounted within the housing. Each of the electronic circuitry units may provide particularized or dedicated functionality for the end user, and this may permit the user to configure a given housing in a modular or customized manner.

In certain types of electrical equipment, for instance in telecommunications networking equipment, it would be desirable to have a mechanism that would permit two or more circuit substrates such as printed circuit boards to be releasably interconnected together. Such an arrangement would allow for various configurations of printed circuit boards to be interchanged with each other in a given enclosure therefor. Moreover, it would be desirable to have a mechanism that would permit two or more component circuit substrates such as printed circuit boards to be releasably interconnected together in a multipart circuit assembly while permitting one of the boards to be removed from a given enclosure therefor and the other of the boards to remain installed and operational therein. It would moreover be desirable to have a mechanism that would permit the said two or more component circuit substrates to be removed from a given enclosure therefor either as an interconnected unit or with one of the component circuit substrates being removable therefrom independently of the component circuit substrates to which the removable component circuit substrate may be attached.

It is therefore an object of the present invention to provide a mechanism which would permit two or more component circuit substrates to be releasably interconnected together, such that at least one of said component circuit substrates was removable from an enclosure therefor independently of the other component substrates to which the removable component substrate may be connected.

These and other objects of the present invention will be made apparent by way of the description of the invention which follows.

SUMMARY OF THE INVENTION

According to a first broad aspect of the present invention, there is provided an assembly of releasably interconnected circuit substrates, the assembly comprising: (a) a first and second circuit substrate, each circuit substrate respectively providing a first and second electrical connector for mating electrical engagement between the first and second circuit substrates; (b) a two-position lock being operable between a first position according to which the first and second circuit substrates are in locked interconnection with each other and a second position according to which the first and second circuit substrates are separable from each other.

BRIEF DESCRIPTION OF THE DRAWINGS

For a better understanding of the present invention and to show more clearly how it may be carried into effect, reference is now made, by way of example only and not of limitation, to the accompanying drawings in which:

FIG. 5 is a perspective view of a first component circuit substrate of the multipart interconnected circuit assembly according to an embodiment of the present invention, wherein the first component circuit substrate is shown detached and apart from a second component circuit substrate thereof;

FIG. 6 is a side elevation view of the first component circuit substrate of FIG. 5;

FIG. 7 is an end elevation view of the first component circuit substrate of FIGS. 5 and 6;

FIG. 8 is a perspective view of a second component circuit substrate of the multipart interconnected circuit assembly according to an embodiment of the present invention, wherein the second component circuit substrate is shown detached and apart from the first component circuit substrate thereof of FIGS. 5, 6 and 7;

FIG. 9 is an end elevation view of the second component circuit substrate of FIG. 8, showing an end thereof which mates electrically with the first component circuit substrate of FIGS. 5, 6 and 7;

FIG. 10 is a side elevation view of the second component circuit substrate of FIGS. 8 and 9;

FIG. 11 is another end elevation view of the second component circuit substrate of FIGS. 8, 9 and 10, showing an end thereof which mates electrically with the shelf of the enclosure of FIGS. 1 to 4;

FIG. 12 is an exploded perspective view of the first component circuit substrate of FIGS. 5 to 7 and the second component circuit substrate of FIGS. 8 to 11, wherein a daughter card of the first component circuit substrate has not been illustrated so as to highlight interconnection features of the multipart interconnected circuit assembly of FIG. 1;

FIG. 13 is another perspective view of the first and second component circuit substrates of FIG. 12, wherein the said substrates are shown interconnected to one another;

FIG. 14 is a side elevation view of the first and second component circuit substrates in their interconnected configuration of FIG. 13, wherein a portion of a locking mechanism provided with the first component circuit substrate has been phantomed for sake of illustration;

FIG. 15 is a side elevation view of the multipart interconnected circuit assembly of FIG. 1, wherein both the first component circuit substrate of FIGS. 5 to 7 and the second component circuit substrate of FIGS. 8 to 11 are shown interconnected together, and wherein certain components and parts thereof have not been illustrated so as to highlight interconnection features thereof;

FIG. 15a is a cross-sectional end view showing a detail of interconnection between the first component circuit substrate of FIGS. 5 to 7 and the second component circuit substrate of FIGS. 8 to 11, namely the engagement of a leading edge of the first component circuit substrate with a guide channel provided on the second component circuit substrate;

FIG. 15b is a cross-sectional end view showing another detail of interconnection between the first component circuit substrate of FIGS. 5 to 7 and the second component circuit substrate of FIGS. 8 to 11, namely the engagement of a guide frame provided on the first component circuit substrate with a guide arm provided on the second component circuit substrate;

FIG. 16b is another exploded perspective view of the first and second component circuit substrates of FIGS. 5 to 7 and FIGS. 8 to 11 respectively, wherein the circuit substrates are aligned generally transversely to their direction of alignment in FIG. 16a;

FIG. 17 is a side elevation view of the multipart interconnected circuit assembly of FIG. 1, wherein both the first component circuit substrate of FIGS. 5 to 7 and the second component circuit substrate of FIGS. 8 to 11 are shown interconnected together and wherein certain components and parts thereof have not been illustrated so as to highlight features of the locking mechanism thereof;

FIG. 18 is a partial exploded perspective view of the first component circuit substrate of FIGS. 5 to 7, showing details of the locking mechanism of the multipart interconnected circuit assembly of FIG. 1; and FIGS. 19 and 20 are each a partial side elevation view of the first and second component circuit substrates of FIGS. 5 to 7 and of FIGS. 8 to 11 respectively, in their interconnected configuration, and showing further details of the locking mechanism of the multipart interconnected circuit assembly of FIG. 1.

DETAILED DESCRIPTION OF EMBODIMENTS

Figure 1:
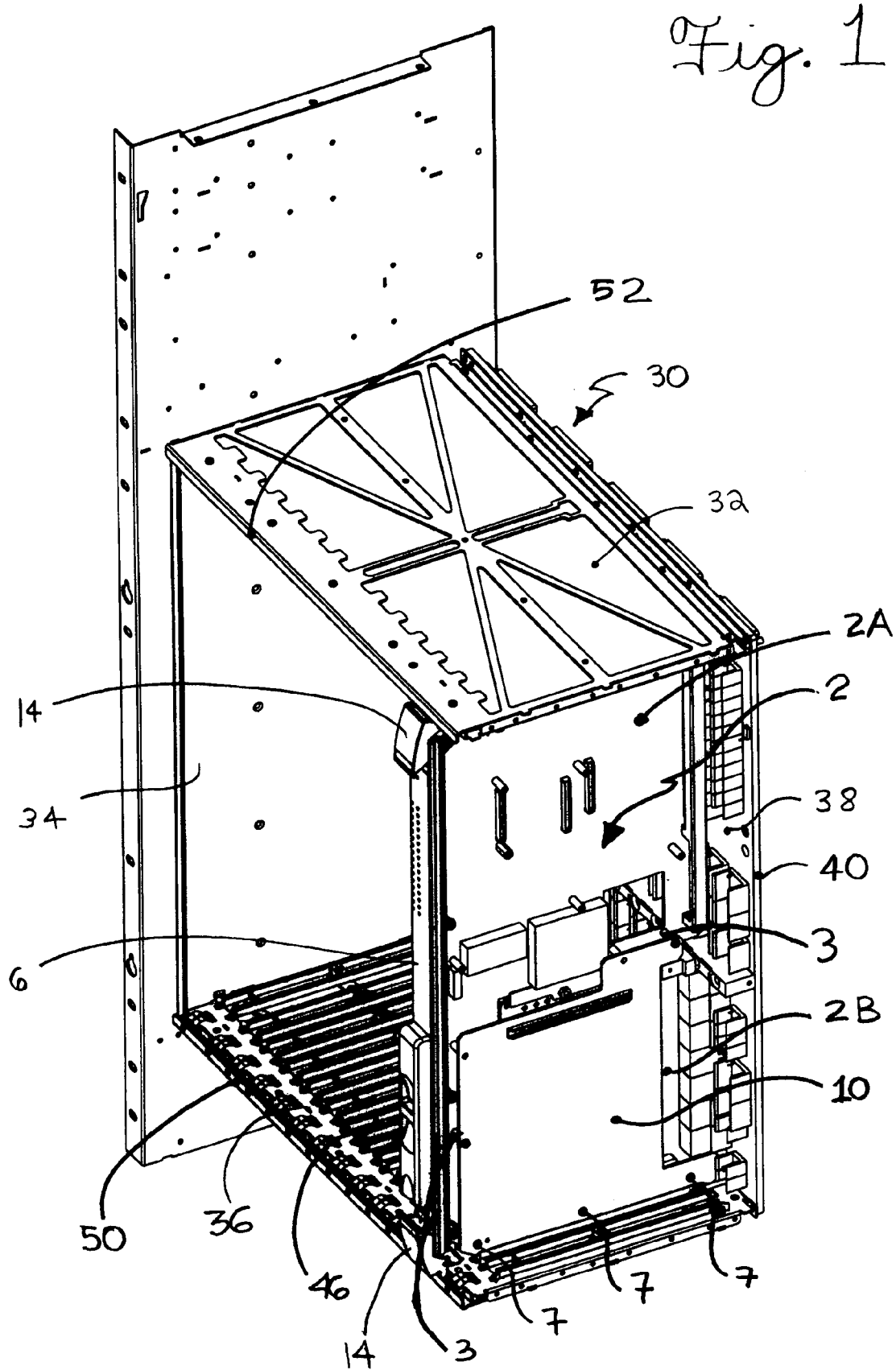
FIG. 1 is a perspective view of a shelf of an equipment housing in which a multipart interconnected circuit assembly according to an illustrative embodiment of the present invention has been deployed (a panel adjacent to the interconnected circuit assembly having been removed from the housing for sake of clarity)
Figure 2:
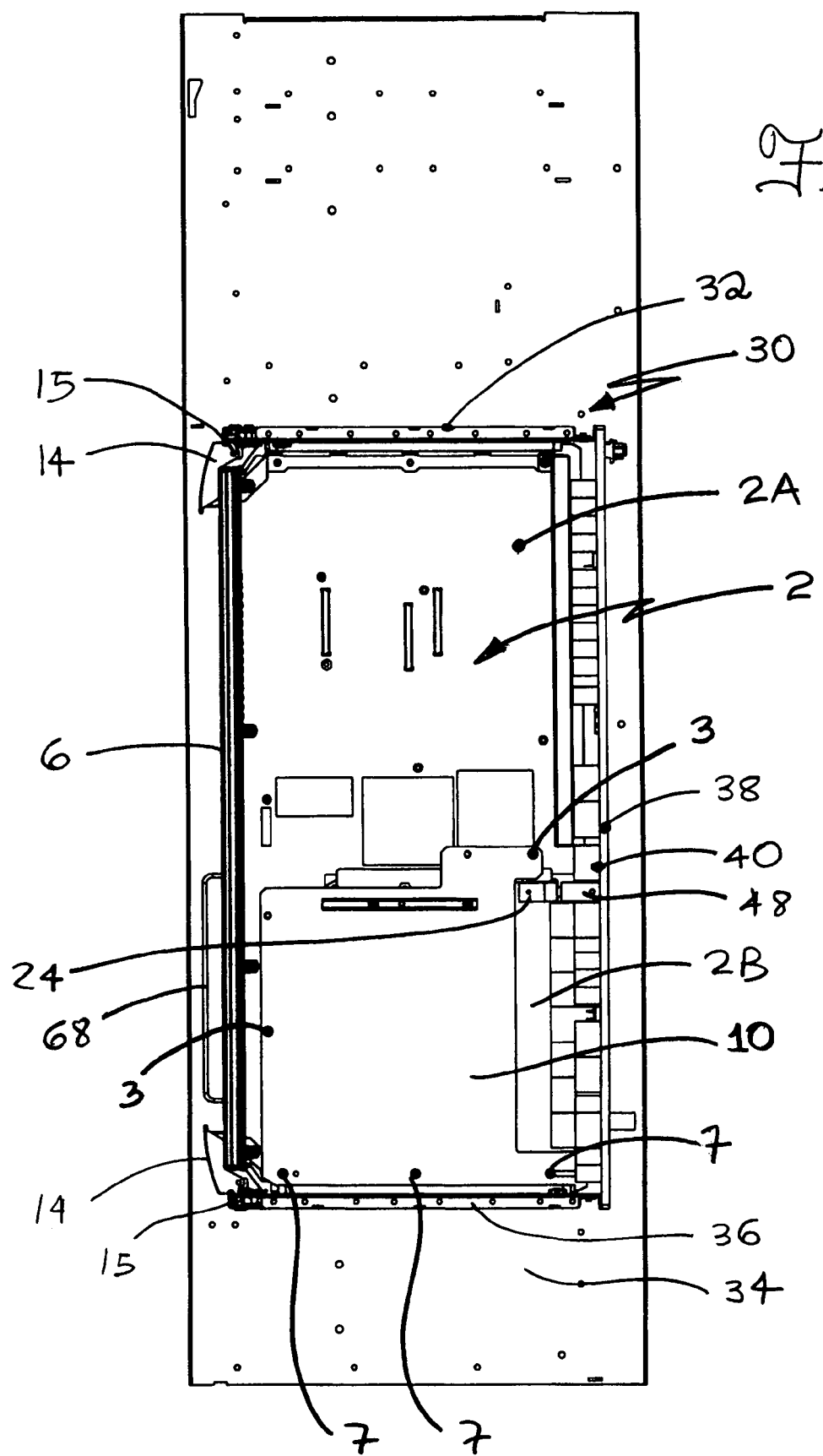
FIG. 2 is an elevation view of the shelf of the housing of FIG. 1, with the multipart interconnected circuit assembly of FIG. 1 being deployed therein.

The description which follows, and the embodiments described therein, are provided by way of illustration of an example or examples of particular embodiments which reflect principles of the present invention. These examples are provided for purposes of explanation, and not of limitation, of those principles and of the invention. In the description which follows, like parts are marked throughout the specification and the drawings with the same respective reference numerals.

Referring to FIG. 1, there is shown an electrical housing 30 which may be of the type known and used in telecommunications switching equipment. The housing 30 is a generally rectangular enclosure that has outer panels 32, 34 and 36. Each of the outer panels 32, 34 and 36 is attached to a backplane 38, which is described in greater detail below. An additional outer panel (not shown for clarity) extends from the backplane 38, as at edge 40 thereof. The housing 30 is open at one face thereof to provide access to one or more circuit substrate receiving stations in the form of shelves 42. Each shelf 42 comprises, in conventional fashion, a set of first and second longitudinal guides 44 and 46 which are generally disposed in opposed relation to one another.

In the illustrative embodiment, each opposed pair of guides 44 and 46 are generally coplanar and each shelf 42 measures approximately 20 inches from the first guide 44 to the second guide 46. First and second guides 44 and 46 extend in a direction generally transverse to the backplane 38 of the housing 30 and serve to direct the insertion and removal of electronic circuitry units or circuit packs, such as the multipart interconnected circuit assembly 2 or its separable component circuit substrates 2A and 2B, all as explained in greater detail below.

Figure 3:
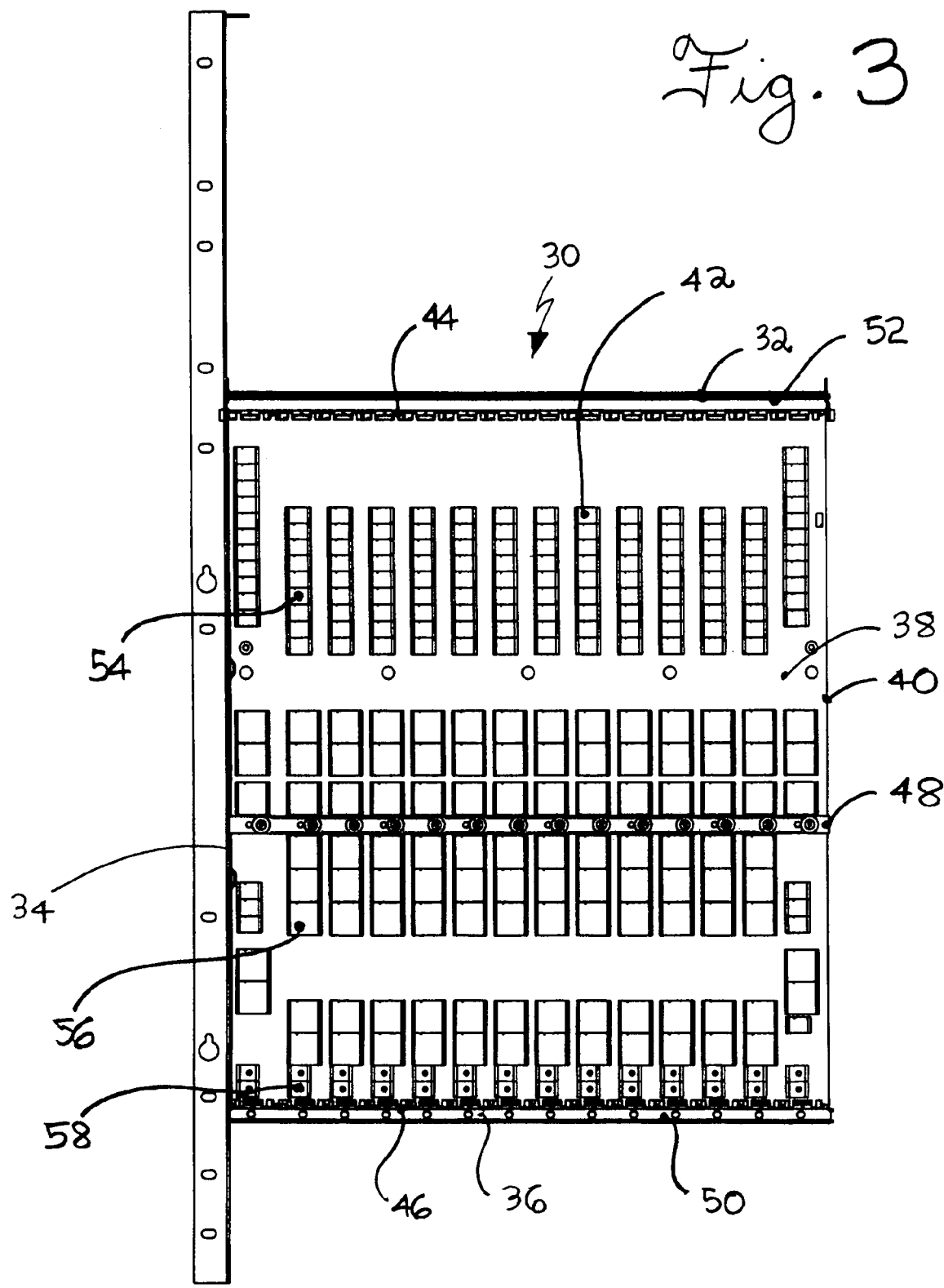
FIG. 3 is another elevation view of the shelf of the housing of FIG. 1, transverse to the view of FIG. 2, wherein the multipart interconnected circuit assembly according to the present invention has not been deployed therein.

Once installed in the manner described below, the component circuit substrates 2A and 2B electrically interconnect with respective electrical connectors 54 and 56 (FIG. 3) provided with backplane 38. Electrical connectors 54 and 56 may be known pin type connectors with press fit headers. Additionally, backplane 38 may be provided with known connectors in the form of power pins 58 (FIG. 3). Power pins 58 provide an electrical ground or EDG (Electrical Dumping Ground) to the mounted multipart interconnected circuit assembly 2, and the mounted component substrate 2B thereof when the latter is separate therefrom, to prevent surges of static electricity.

Backplane 38 has a stiffener member or bar 48 which extends across the center thereof and tends to discourage deflection therein so that proper electrical connection may be achieved with the multipart interconnected circuit assembly 2 or its component circuit substrates 2A and 2B. As well, the stiffener bar 48 serves an alignment function and provides a fastening point for component circuit substrate 2B as explained below. Housing 30 also has first and second cross-members 50 and 52 which extend between the free terminal edges of two opposed outer panels, for instance the outer panels 32 and 36. Cross-members 50 and 52 provide attachment sites to which the multipart interconnected circuit assembly 2 may be fastened during installation thereof into housing 30.

Turning now to FIG. 5, the first component circuit substrate 2A of the multipart interconnected circuit assembly 2 according to an embodiment of the present invention will next be described. In the embodiment herein described, the multipart interconnected circuit assembly 2 provides two interconnected component circuit substrates 2A and 2B, but those skilled in this art will appreciate that the present invention is adaptable to multipart interconnected circuit assemblies 2 having more than two such parts. The first component circuit substrate 2A comprises a printed circuit board or card 4, to which may be mounted a plurality of electronic components (not shown), and further comprises a transverse web, such as a faceplate 6, adjacent an edge of the printed circuit card 4 such that the faceplate 6 will be in external view to a user thereof when the first component circuit substrate is mounted in operation within the enclosure 30.

In addition to the printed circuit card 4, the first component circuit substrate 2A also provides a daughter card 10 that is spaced apart from the printed circuit card 4, for instance in a substantially parallel relationship thereto. As best shown in FIG. 12, the daughter card 10 may be attached to the circuit board 4 by means of spacer pins 3 and a guide frame 5, by way of example. The guide frame 5 extends generally transversely from faceplate 6 adjacent one terminal end thereof and provides an attachment edge 5a (FIG. 15b) that extends generally parallel to the printed circuit card 4 and to which daughter card 10 may be secured with suitable fasteners 7 or the like (FIGS. 5 and 6). Another function of guide frame 5 will be described hereinbelow.

Daughter card 10 presents a leading edge 9 (FIGS. 5 and 6) adjacent a terminal end of the faceplate 6. The leading edge 9 is generally transverse to the backplane 38 when the multipart interconnected circuit assembly 2 is installed in the enclosure 30. Leading edge 9 of the daughter card 10 mates in sliding engagement with one of guides 46 of the enclosure 30. Distally therefrom, leading edge 11 of the printed circuit card 4 (FIGS. 5 and 6) mates in sliding engagement with one of guides 44 of the enclosure 30. While the leading edges 9 and 11 are generally parallel to one another, they are not coplanar when considered together with their respective mating guides 46 and 44 of enclosure 30 in the illustrated embodiment. In other words, leading edge 9 of daughter card 10 will mate with a guide 46 of the enclosure 30 that is not in a directly opposed coplanar relationship with the guide 44 of enclosure 30 with which leading edge 11 of the printed circuit card 4 mates.

The printed circuit card 4 is generally L-shaped, as best discerned from FIGS. 12 to 14. First component circuit substrate 2A also comprises at least one electrical connector 8 mounted adjacent one or more edges thereof for electrical interconnection to electrical connectors 54 of backplane 38 of the enclosure 30. In the illustrated embodiment, the edge of the first component circuit substrate 2A to which electrical connector 8 is mounted is distal from the edge thereof to which faceplate 6 is attached. First component circuit substrate 2A also provides at least another electrical connector 12, best shown in FIG. 18, for mating electrical engagement with second component circuit substrate 2B. In the illustrated embodiment, the electrical connector 12 of the first component circuit substrate 2A faces in a direction of connection that is generally parallel to the electrical connector 8 thereof, but further removed from the backplane 38 when the first component circuit substrate 2A is installed within enclosure 30.

Faceplate 6 of the first component substrate 2A has a pair of card insertion actuators or card ejectors, for instance in the form of levers 14 mounted adjacent each terminal end of the faceplate 6. Each of the levers 14 pivots about an axis 15 that is generally transverse to the plane surfaces of printed circuit card 4 and generally parallel to the surface presented by the faceplate 6. The levers 14 are moveable between an open position (not shown) and a closed position, as known to those skilled in this art. Each lever 14 has a distal or free end that can be grasped to actuate the lever 14 between its open and closed positions as aforesaid. Opposite the distal end of each lever 14 are a pair of spaced apart tabs 16 and 17. In the closed position of the levers 14, the tabs 16 and 17 project generally in a direction parallel to the lengthwise direction of the faceplate 6. When the levers 14 are actuated from their respective open positions to their respective closed positions, the tabs 16 and 17 of each lever 14 are caused to engage a portion of the applicable cross-member 50 and 52 in the manner known to those in this art. As the levers 14 move between their respective open and closed positions, the component circuit substrate 2A is urged to advance further into a shelf 42, towards backplane 38. When the levers 14 are in their respective closed positions, the connector 8 of the first component circuit substrate 2A will be electrically connected to its corresponding electrical connector 54 of backplane 38. In like manner, when the levers 14 are in their respective closed positions, the connector 12 of the first component circuit substrate 2A will be electrically mated to its counterpart electrical connector 18 of the second component circuit substrate 2B, next to be described.

Turning now to FIGS. 8 to 11, the second component circuit substrate 2B comprises a printed circuit board or card 19 to which may be mounted a plurality of electronic components (not shown). The second component circuit substrate 2B provides at least one electrical connector 20 that is attached to the printed circuit card 19 along at least one edge 19 thereof (FIGS. 16a and 16b) and which is for electrical connection with electrical connector 56 of backplane 38. Adjacent the electrical connector 20 is a locating and alignment guide pin 24 which is for mating engagement with a corresponding receiving bore or the like therefor provided in the stiffener bar 48 of backplane 38, previously described. In the illustrated embodiment, another electrical connector 22 is provided on the second component circuit substrate 2B on the same edge 19 thereof to which connector 20 is attached for mating electrical connection to power pins 58 of backplane 38, also previously described. At least one other electrical connector 18 may be provided with the second component circuit substrate 2B for mating electrical engagement with the earlier discussed corresponding electrical connector 12 of the first component circuit substrate 2A.

As with leading edge 9 of the daughter card 10 of the first component circuit substrate 2A, the leading edge 21 of the second component circuit substrate 2B likewise mates in sliding engagement with one of guides 46 of the enclosure 30. However, in the illustrated embodiment, the guide 46 with which the leading edge 21 of the second component substrate 2B mates will not be the same as the guide 46 with which the leading edge 9 of the daughter card 10 of the first component circuit substrate mates. Rather, the guide 46 in the case of the second component substrate 2B will be generally opposed and coplanar with the very same guide 44 with which the leading edge 11 of the first component circuit substrate mates. As well, in the illustrated embodiment, the guide 46 with which the leading edge 21 of the second component substrate 2B mates will be next immediately adjacent to the guide 46 with which the leading edge 9 of the daughter card 10 of the first component circuit substrate mates.

The second component circuit substrate 2B further provides at least one latch arm, for instance a pair of latch arms 66, each of which extends in a parallel orientation and in the same general direction as the leading edge 21 of the second component circuit substrate 2B. The latch arms 66 form part of a lock or locking mechanism for the first and second component circuit substrates 2A and 2B, as described more fully below.

Figure 16A:
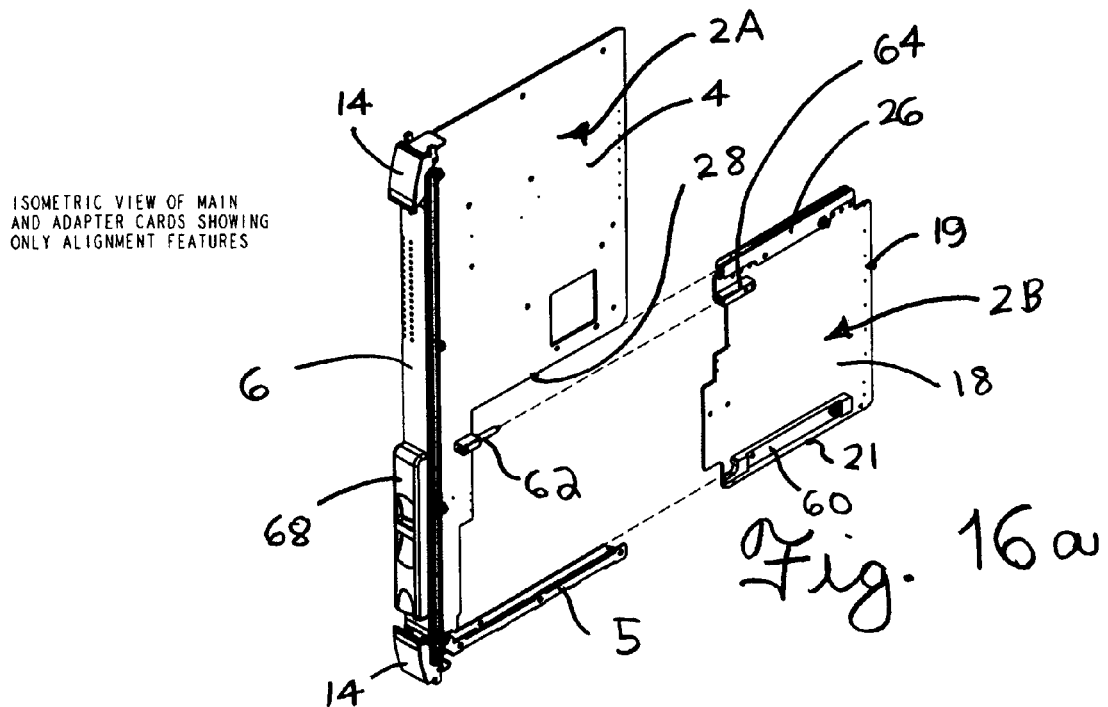
FIG. 16a is an exploded perspective view of the first component circuit substrate of FIGS. 5 to 7 and the second component circuit substrate of FIGS. 8 to 11, wherein certain components and parts thereof have not been illustrated so as to highlight interconnection features of the multipart interconnected circuit assembly of FIG. 1.
Figure 16B:
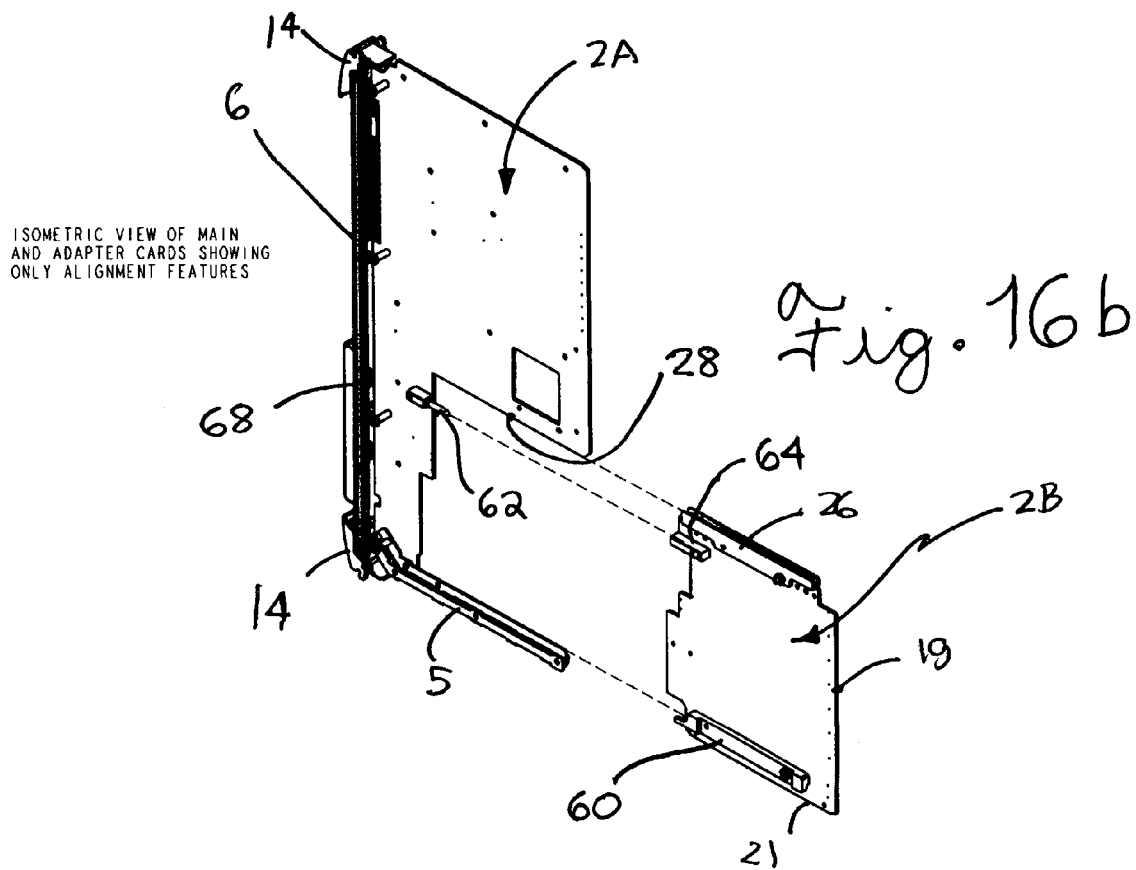

With particular reference to FIGS. 15 through 16b, the interconnection of the component circuit substrates 2A and 2B of the multipart interconnected circuit assembly 2 will now be described in detail. The second component circuit substrate 2B provides a guide channel 26 (best illustrated in FIGS. 8 to 11) along an edge of the printed circuit card 18 thereof that is distal and parallel to leading edge 21 of the component circuit substrate 2B. Guide channel 26 slidably engages with edge 28 (FIGS. 16a and 16b) of the first component circuit substrate 2A, as best illustrated in FIG. 15a. Moreover, a guide arm 60 is provided with the second component circuit substrate 2B adjacent the length of leading edge 21 thereof. As best illustrated in FIGS. 12 to 14 and in FIG. 15b, guide arm 60 is for mating and sliding engagement with the guide frame 5 of first component circuit substrate 2A, previously described.

Additionally to the cooperation of guide channel 26 and edge 28 together with that of guide arm 60 and guide frame 5, a locating and alignment pin 62 (FIGS. 16a and 16b) may be provided on either of the component circuit substrates 2A or 2B, for instance with first component circuit substrate 2A as shown. The locating and alignment pin 62 is for mating engagement with a cooperating receiving bore 64 (FIGS. 16a and 1b) therefor provided on the other of the component circuit substrates 2A or 2B, for instance with second component circuit substrate 2B as shown.

With reference to FIGS. 17 to 20, the lock or locking mechanism alluded to earlier for the first and second component circuit substrates 2A and 2B will next be described. In the illustrated embodiment, the locking mechanism is a two-position lock such as a latch. However, those skilled in this art will appreciate that other locking mechanisms for releasably interconnecting the first and second component circuit substrates 2A and 2B may be suitable. In addition to the latch arms 66 discussed above, the locking mechanism comprises a sliding switch having a handle 68 to which is fixedly attached a backplate 70 by means of appropriate fasteners 71. The handle 68 is movable between two positions, as described in greater detail immediately below. The movement of the handle 68 is controlled by pins 74 that are each attached to the backplate 70 and which are slidably retained within corresponding slots 75 therefor whose length defines the range of intended movement for the handle 68.

Figure 4:
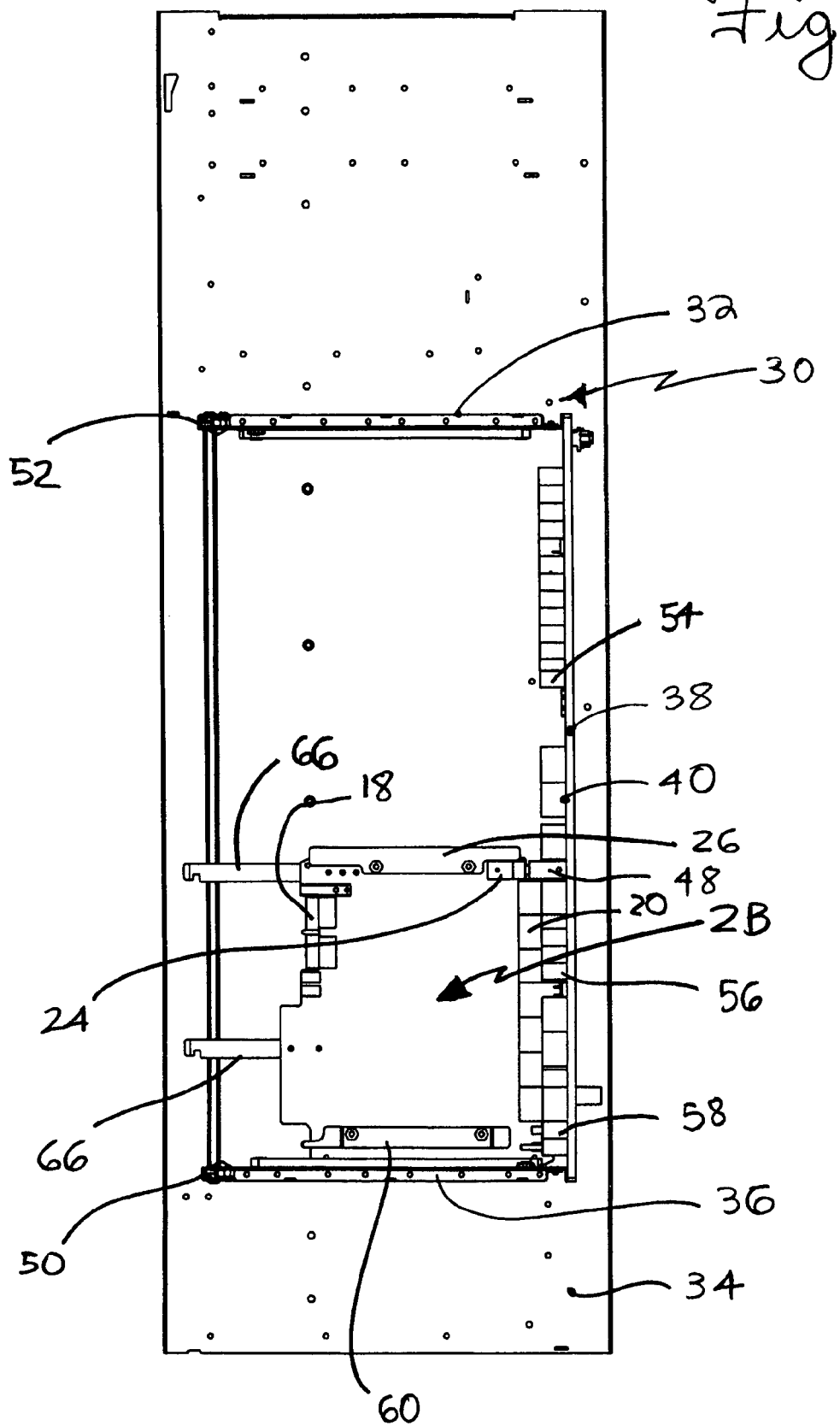
FIG. 4 is another elevation view of the shelf of the housing of FIG. 1, in the same direction as the view of FIG. 2, in which a first component substrate of the multipart circuit assembly has been releasably detached from a second component circuit substrate thereof which remains electrically connected to the shelf.

Backplate 70 has two slots 72 therein for respectively receiving the terminal ends of the latch arms 66. The latch arms 66 extend through faceplate 6 by means of respective apertures 80 provided therein. The terminal ends of the latch arms 66 are each provided with a notch 74 therein which engages with a terminal end of its corresponding slot 72 in the backplate 70 when the handle 68 is moved to a locked position as best shown in FIG. 19. In this locked position, the latch arms 66 are engaged as aforesaid with the terminal ends of their respective slots 72 in backplate 70, such that the removal of the first component circuit substrate 2A from its shelf 42 will also result in the removal of the second component substrate 2B interconnected thereto. When the handle 68 is moved to its unlocked position as best shown in FIG. 20, the latch arms 66 are not engaged as aforesaid with the terminal end of their respective corresponding slots 72 in backplate 70. In the unlocked position then, the first component circuit substrate 2A may be removed from its shelf 42 and the latch arms 66 will each be withdrawn unimpeded from the slots 72 of backplate 70, leaving the second component circuit substrate 2B electrically connected and mechanically undisturbed in the shelf 42 as shown in FIG. 4.

If desired, the locking mechanism as aforesaid can be provisioned to exhibit some form of resistance when positioned in its locked position of FIG. 19 or in its unlocked position of FIG. 20, so as to alleviate any accidental or inadvertent movement away from either or both of the said positions. For instance, in the embodiment as illustrated in FIGS. 18 to 20, a retainer is provided for discouraging movement of the mechanism away from its locked and unlocked positions. The retainer may comprise a pushpin 76 that is attached to the handle 68 so as to bear against the surface of faceplate 6. The pushpin 76 is of the kind known to those in this art, and is a hollow cylinder that contains a biasing means such as a spring (not shown) and a spherical bearing or the like (not shown). The spring urges the spherical bearing against the aforesaid surface of faceplate 6. Two receiving detent slots 78 for the bearing are provided in the faceplate 6 and are spaced apart substantially at a distance which defines the intended range of motion for the handle 68. As the handle 68 is brought to either of its locked or unlocked positions, the bearing of the pushpin 76 will seat itself within the applicable detent slots to thereby offer resistance to the movement of the handle 68 away from its current chosen position. Those skilled in this art will appreciate that many other methods of retaining the handle 68 in either or both of its locked and unlocked positions may be suitable for use with the illustrated embodiment of the present invention.

In the illustrated embodiment, the housing 30 may be the 350 Integrated Versatile Services Node (ISVN) (trademark), manufactured by Alcatel Canada Inc. of Kanata, Ontario, or any other like housing for telecommunications switching equipment. The present invention may advantageously permit the first component circuit substrate 2A of the multipart interconnected circuit assembly 2 to be removed from housing 30 while leaving the second component circuit substrate 2B thereof installed and operational therein. This may lend itself to applications such as the hot redundant swapping of the first component circuit substrate 2A wherein the continued operation of the second component circuit substrate 2B from which it has been detached is preserved. As well, the present invention can be deployed to allow for various configurations of printed circuit cards to be interchanged with one another in a given enclosure therefore.

Although the above description has been made with reference to equipment in the nature of telecommunications switching equipment, those skilled in this art will appreciate that other types of electrical or electronic equipment may be used in conjunction with various embodiments of the invention. It will likewise be understood by those skilled in this art that the foregoing description is made with reference to illustrative embodiments of the invention and that other embodiments employing the principles of the invention may be envisaged, all of which fall within the spirit and scope thereof.

We claim:

1. An assembly of releasably interconnected circuit substrates, the assembly comprising:
   a first and second circuit substrate, each circuit substrate respectively providing a first and second electrical connector for mating electrical engagement between the first and second circuit substrates;
   an enclosure including at least two longitudinal guides, each of the longitudinal guides receiving a respective leading edge of the first and second circuit substrates, wherein one of the longitudinal guides receives leading edges of both the first and second circuit substrates; and
   a two-position lock being operable between a first position according to which the first and second circuit substrates are in locked interconnection with each other and a second position according to which the first and second circuit substrates are separable from each other.

2. The assembly according to claim 1, wherein the first and second circuit substrates slidably interconnect together along respective opposed edges thereof that are substantially parallel to each respective leading edge thereof.

3. The assembly according to claim 2, wherein the two-position lock further includes a retainer for discouraging movement of the lock away from one of the first and second positions thereof.

4. The assembly according to claim 3, wherein the retainer discourages movement of the lock away from each of the first and second positions thereof.

5. The assembly according to claim 4, wherein the first circuit substrate, when mounted in said enclosure therefor, presents a portion thereof which faces outwardly of said enclosure and from which said lock is operable.

6. The assembly according to claim 5, wherein the portion of the first circuit substrate as aforesaid is a web extending along an edge of said first circuit substrate which is transverse to said leading edge and said opposed edge thereof.

7. The assembly according to claim 6, wherein the lock is operable between the first and second positions thereof by sliding movement.

8. The assembly according to claim 7, wherein the lock further comprises at least one latch arm depending from the second circuit substrate in a direction substantially parallel to said leading edge and to said opposed edge thereof, each said latch arm extending through an aperture therefor provided in said web of the first circuit substrate for mating with a handle that is mounted to the web, the handle being operable between said first and second positions of the lock to respectively engage and disengage each said latch arm.

9. The assembly according to claim 8, wherein the lock comprises two latch arms, each latch arm providing a notch adjacent a terminal end thereof for receiving a corresponding mating portion of said handle when same engages the latch arms.

10. The assembly according to claim 9, wherein the retainer comprises a bearing provided with the handle which urges against the web and which seats with two detents therefor provided in the web, the detents being located to correspond with said first and second positions of the lock.

11. The assembly according to claim 10, wherein the second circuit substrate is provided with a longitudinal channel adjacent the opposed edge thereof for receiving the opposed edge of the first circuit substrate.

12. The assembly according to claim 11, wherein the first circuit substrate is provided with a longitudinal guide for receiving a corresponding guide arm of the second circuit substrate that is located thereon adjacent the leading edge thereof.

13. The assembly according to claim 12, wherein the first circuit substrate further provides an additional substrate presenting a leading edge thereof that is received in a corresponding longitudinal guide of the enclosure that is different from the longitudinal guide thereof which receives the leading edge of the second circuit substrate.

14. The assembly according to claim 2, wherein the lock is operable between the first and second positions thereof by sliding movement.

* * * * *